United States Patent
Pray

[11] 3,800,928
[45] Apr. 2, 1974

[54] POSITIVE LUBRICATION HYDRAULIC DISC CLUTCH

[75] Inventor: Lawrence H. Pray, Sterling Heights, Mich.

[73] Assignee: Formsprag Co., Warren, Mich.

[22] Filed: July 10, 1972

[21] Appl. No.: 270,240

Related U.S. Application Data

[63] Continuation-in-part of Ser. No. 82,944, Oct. 22, 1970, Pat. No. 3,684,069, and a continuation-in-part of Ser. No. 82,115, Oct. 19, 1970, which is a continuation of Ser. No. 825,567, May 19, 1969, abandoned.

[52] U.S. Cl............................ 192/85 CA, 192/110 B
[51] Int. Cl............................................. F16d 25/08
[58] Field of Search........ 192/85 CA, 110 B, 113 B, 192/91 A

[56] References Cited
UNITED STATES PATENTS

| | | | |
|---|---|---|---|
| 3,412,834 | 11/1968 | Root................................ | 192/85 CA |
| 3,429,410 | 2/1969 | Hansen........................... | 192/85 CA |
| 3,444,971 | 5/1969 | Davidson........................ | 192/85 CA |
| 3,613,848 | 10/1971 | Reiff.............................. | 192/85 CA |
| 3,706,365 | 12/1972 | Bohm............................. | 192/85 CA |

Primary Examiner—Benjamin W. Wyche
Attorney, Agent, or Firm—Whittmore, Hulbert & Belknap

[57] ABSTRACT

The clutch features a conventional friction disc stack spring-urged to release condition and engaged to clutch by a hydraulically powered piston which compresses the stack axially through the agency of needle bearing means. The piston operates in an annular cylinder supplied from the exterior by hydraulic pressure fluid entering a supply fitting of a fixed mounting member of the clutch, which fluid also pressure-lubricates both the needle bearing and a combined radial and axial thrust-type ball bearing. The latter is received in a space in the mounting member located on a side of a radial cylinder wall of said member opposite the wall side which in part defines the piston's cylinder space. The mounting member is specially end face-milled locally in the annular zone receiving the ball bearing to provide a quasi-cylindrical and radially relieved internal bore and counter-bore formation, into and through which the pressure liquid flows from the fitting under a throttling force-augmenting effect. This is by reason of the flow restriction imposed by the special end face machining, flow being in the portion of the bore and counter-bore not occupied by the radial being, thence through an axial zone between the cylinder portion of the mounting member and an axial driver of the clutch journalled by said member, thence radially outwardly to lubricate the needle bearing unit. Forced lubricant flow also takes place simultaneously in the opposite direction to similarly pressure-lubricate the radial ball bearing; and in both instances the circulation of lubricant is entirely external and independent of passage means into or through the pressure cylinder.

27 Claims, 5 Drawing Figures

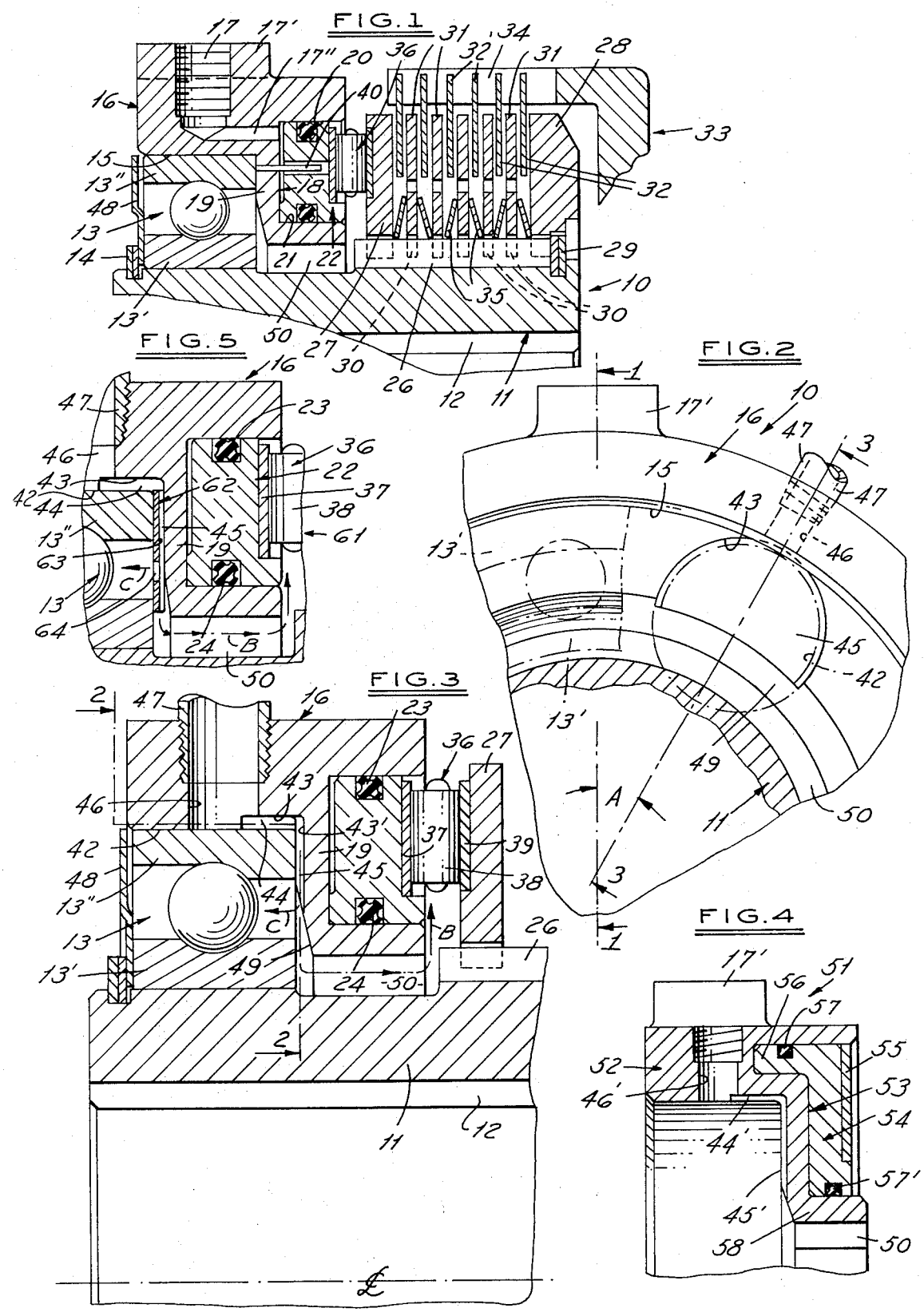

POSITIVE LUBRICATION HYDRAULIC DISC CLUTCH

CROSS-REFERENCE TO RELATED APPLICATIONS

The present application is a continuation-in-part of my co-pending application, Ser. No. 82,115, filed Oct. 19, 1970, which is a continuation of an earlier application, Ser. No. 825,567, filed May 19, 1969 and now abandoned; and it is also a continuation-in-part of my co-pending application, Ser. No. 82,944, filed Oct. 22, 1970 now U.S. Pat. No. 3,684,069. These earlier applications show and describe the general organization of clutch disc stack, piston and cylinder and needle and radial bearing means of the present improvement, but not the positive force hydraulic lubrication feature of the latter.

BACKGROUND OF THE INVENTION

1. Field of the Invention

The improvement finds its best contemplated application in segments of the fluid-pressure operated disc clutch field in which a proper and efficient built-in lubrication of bearings is necessary or highly desirable regardless, for example, of the type of gear box with which the clutch is to be associated, as in a dry sump installation, or regardless of a proximity of the clutch to some other device which would not permit proper bearing lubrication in the absence of means similar to the present improvement, or by reason of the existence of some related sort of condition.

2. Description of the Prior Art

The most pertinent prior art U.S. Pats. of which I am aware are those to Hansen, No. 3,011,608 of Dec. 5, 1961, and No. 3,429,410 of Feb. 25, 1969, also Davidson, No. 3,444,971 of May 20, 1969. These, like the parent application hereof, relate to hydraulically operated disc clutches, but only in the most general way insofar as the presently claimed subject matter is concerned.

SUMMARY OF THE INVENTION

As in the case of said patents and application, the improved clutch has a fixed mounting member affording an internal hydraulically powered cylinder, within which an annular, axially acting piston of one cross-section or another releasably compresses a stack of clutch discs to clutch-engage and drive the cup of an outer output member from a coaxial inner input sleeve member, the latter being journalled for rotation by and within the mounting member through the agency of a large size combined radial and axial thrust-type ball bearing. This bearing, as sustained against axial movement by a snap ring on the input member, plentifully affords a needed ruggedness of radial bearing support and, by reason of its location in an axial zone spaced from that of the hydraulic cylinder, the bearing may be designed (within practical limits) in any desired radius of its outer race, as press-fitted into a space of the mounting member, to provide needed radial load capacity, without entailing an increase in the outer diameter of the clutch as a whole.

The annular piston acts axially against a needle bearing unit of large diameter and load capacity which surrounds and is spaced radially well outwardly of the input driver sleeve, said spacing being such that the circular radial mid-zone of the needle bearing substantially coincides with the corresponding circular median zone of the piston, as well as that of pressure and backing plates containing the friction disc stack. The effective zone of force transmission at the needle bearing unit is neither substantially radially inward nor radially outward of the median circular zone of transmission through the piston and the clutch disc subassembly. Thus axial clutch-engaging thrust is transmitted through all of these parts in a very stable and uniformly distributed manner, without setting up variable bending stresses in any part of the clutch structure. Yet the large diameter of the needle bearing affords needed axial thrust receiving capacity under a relatively low unit loading axial-wise. The axial dimension of the clutch structure is low as compared with one having an axial bearing unit of a different design; and this couples with a minimized overall clutch diameter due to the nature and location of the radial bearing, as mentioned above.

Most significantly in regard to the present improvement, the positive built-in lubrication of radial and axial thrust bearings, i.e., directly from an oil pressure supply fitting of the clutch through axial and radial restriction passaging, enables the clutch to accommodate itself to various types of limitation on efficient lubrication due to gear box design, external physical obstruction and the like, such as are mentioned above in Background-Field. The lubricant path includes no internal part of the cylinder.

BRIEF DESCRIPTION OF THE DRAWINGS

FIG. 1 is a partially broken sectional view of the improved positive lubrication type hydraulic disc clutch in a plane including the latter's axis and the center of an external hydraulic lubrication supply fitting, as indicated by section line 1—1 in FIG. 2;

FIG. 2 is a fragmentary end elevational view, as on broken line 2—2 of FIGS. 1 and 3, showing the nature and result of a special end face milling operation performed on the mounting member of the clutch to afford lubricating passageway means contemplated by the invention, a part of the radial and axial thrust ball bearing being indicated for reference in dot-dash line;

FIG. 3 is a view in section similar to FIG. 1, but in an approximately 30° angularly spaced relation to the latter along line 3—3 of FIG. 2;

FIG. 4 is a fragmentary view of a slightly modified alternative embodiment of the invention, being sectioned similarly to FIG. 1, and with the radial bearing and a driver sleeve of the latter omitted for clarity; and FIG. 5 is a fragmentary view in section similar to FIGS. 3 and 4 of a still further modification featuring the use of an oil flow control plate disposed in a portion of the restrictive passage means of the clutch.

DESCRIPTION OF PREFERRED EMBODIMENTS

The clutch of the invention, as shown in assembly in FIGS. 1 and 3 and generally designated by the reference numeral 10, comprises an input or driving hub or sleeve 11 which is internally keyed at 12 to be rotatively operated by an appropriate drive shaft (not shown). This sleeve is rotatably journalled by a very rugged radial and axial thrust ball bearing 13, the inner race 13' of which, as force or otherwise secured to rotate with sleeve 11, bears against an axial restraining snap-ring abutment 14 on the latter. The outer race 13'' of the bearing is similarly fixedly received in an annular recess radially outwardly defined by the axial surface 15, the recess opening outwardly of one axial side of a fixed mounting or housing member 16 of the clutch. This member is suitably restrained in any desired manner against rotation, thus serving as a strong and stable radial bearing support for the drive hub 11. Mounting member 16 has a hydraulic pressure intake or supply port 17 tapped in an external boss 17' thereof; and the port communicates through a short lateral passage 17'' (FIG. 1) with an annular cylinder recess 18 intermediate the radial limits of mounting member 16, this recess being of substantial radial dimension and opening to the right as viewed in FIGS. 1 and 3.

The cylinder space 18 is defined by an inner radial wall portion 19 of member 16, and radially spaced, coaxial outer and inner wall surfaces 20, 21 respectively; these slidably guide an annular piston 22 of generally rectangular cross-section, with annular packings 23 and 24 (FIG. 3) respectively sealing the piston in relation to the cylinder wall surfaces 20 and 21.

Along its right-hand end, the drive sleeve 11 is splined externally at 26 to receive for axially shiftable but rotatively restrained action not only an annular pressure plate 27 of substantial radial width and an axially spaced backing plate 28 rearwardly abutting a snap-type restraining ring 29, but also to receive inner spline formations 30 of alternate, radially inner friction discs 31 of an axial set or stack. Another, radially outer set of friction discs 32 alternate with the discs 31, but are drivingly spline-connected to an annular, cup-like output or driven member 33 of clutch 10, as by outer ear extensions 32' of these discs taking into radial openings 34 of member 33. A series of Belleville springs 35 are alternately positioned between pressure plate 27, clutch discs 31, 32 and backing plate 28, and operate to spread the disc and backing plate members relative to one another when the clutch 10 is in non-clutching condition, i.e., when piston 22 is not subject to hydraulic pressure. Springs 35 of course yield to permit the disc stack to be compressed against one another and backing plate 28 when hydraulic piston pressure is applied through port 17, thus drivingly coupling the torque input hub member 11 to the output cup member 33.

In a general sense the improvement of the invention relates to the nature and positioning of an axial thrust sustaining and transmitting needle bearing, generally designated by the reference numeral 36, which is of very substantial diameter, well exceeding that of cylinder wall 21, such that axial force is exerted by hydraulic piston 22 on a cage-type race 37 (FIG. 3) and needle elements 38 of bearing 36, as confined and disciplined by race 37, through its second flat race 39, with the effective force being exerted along a theoretical annular median zone, in a manner to afford advantages as set forth in the Summary in that, regardless of the axial force involved in the compacting of the disc stack to drive output cup 33 therethrough, this drive is stably attained without setting up significant bending forces or moments to detract from a smooth and vibration-free operational characteristic.

In order to combat a tendency of the needle bearing 36, under a relatively high frictional drag, to cause rotation of the piston 22 within its annular cylinder 18, one or more axially extending pins 40 are fixed in the radial wall portion 19 of cylinder 18, keying into an axial opening or openings at the radial mid-point of piston 22, as appears in FIG. 1.

As best shown in FIGS. 2 and 3, the positive lubrication feature of the invention entails the end-face boring of the mounting member 16 in the axial direction and at an angular spacing A (FIG. 2) of 30° from the center line of the mounting member boss 17' and port 17 in the latter. This affords an axial bore 42 opening inwardly from the left-hand (FIG. 3) side face of member 16 and an inner counter-bore 43 enlargement of that bore. Both of these bore formations are of quasi-cylindrical shape inasmuch as they radially intersect the inner periphery of member 16 beneath the latter's radial wall 19. Said periphery is of greater diameter than the o.d. of drive hub or sleeve 11 directly inwardly thereof, for a purpose to appear.

The theoretical arcuate projection of the counter-bore's end face machining is indicated in dot-dash line in FIG. 2, and it is seen that the operation affords a somewhat restricted radial clearance space 44 just outwardly of the outer race 13'' of bearing 13. This space directly communicates to the right with an axially more restricted radial space 45 between said outer race and the radial wall 19 of mounting member 16.

Clearance space 44 is in direct communication to the left with a radial hydraulic supply bore 46 drilled in member 16 on the center line of the face-milled bore 42 and counter-bore 43, as appears in FIG. 2; and the bore 46 is externally tapped to receive a ⅛ inch pipe fitting 47, the latter being supplied with hydraulic lubricating pressure fluid from the same source as the operating pressure intake port 17, yet not necessarily so.

The radial restriction passage 45 described above communicates inwardly past the radial end face surface 43' of counter-bore 43, also an angularly relieved surface 49 of radial wall 19; and the radial clearance at 50 (FIG. 3) between mounting member 16 and driver hub 11, just radially inwardly of surface 49, affords an axial lubricant flow passage opening to the right to the axial zone in which the axial thrust needle bearing 36 is disposed, the flow path being wholly independent of cylinder 18.

Thus, there is at all times a flow of hydraulic pressure liquid as a bearing lubricant through radial port 46, clearance space 44, restriction passage 45 and the annular passage 50, the flow being thence past needle bearing 36 to force-lubricate the latter, as indicated by the direction arrow B in FIG. 3. An axial lubricant flow also takes place in the opposite axial direction, as indicated by the arrow C in FIG. 3, thus to correspondingly lubricate the interior of radial and axial thrust bearing 13, with the result that all bearing means of the clutch 10 are continually and effectively positive-lubricated, regardless of the particular nature of any special installation setting of the bearing, such as might well preclude comparable lubrication, absent the improvement of the invention. An annular external guard and splash shield 48 is held between inner race 13' of the radial bearing 13 and the split ring retainer 14, extending radially well over the outer axial face of the bearing. This shield inherently also performs a lubricant flow-metering function, as will later appear.

FIG. 4 illustrates another embodiment of the invention, generally designated 51, differing but slightly from the embodiment of FIGS. 1, 2 and 3, and primarily in respect to structural features of the fixed mounting member and piston slidably in relation thereto to clutch and de-clutch a disc stack (not shown but identical to that of FIGS. 1 and 3). Piston and cylinder features of the embodiment of FIG. 4 are similar to what is shown and described in my co-pending application, Ser. No. 82,944, identified above.

Thus, the mounting member 52 of the modified embodiment 51 of FIG. 4 is machined to provide an internal cylinder 53 of inverted L-shaped cross-section in a plane including the axis of the clutch 51, which cylinder receives a correspondingly cross-sectioned annular piston 54 equipped with an annular thrust plate 55, which for the present purpose may be considered to correspond to the annular needle bearing race 37 of the first embodiment. An upper left-hand axial leg 56 of piston 54 carries a packing 57 pressure-sealing the piston against an adjacent outer axial cylinder surface of mounting member 52; and the piston 54 is slidably guided radially inwardly by an inner axial cylinder wall 58 of member 52, at which the piston 54 is sealed by another packing 57'. The radial clearance between this annular wall and the driver hub (not shown) will afford an axially extending passage 50 through which lubricating oil force-fed communication with the axial needle bearing zone is established.

For the rest, the end face positive lubrication machining of the member 52 is substantially identical to that described above in connection with FIGS. 1, 2 and 3; hence corresponding primed reference numerals are employed to designate corresponding parts and relationships. Thus, a radial oil supply port or bore 46', in 30° axially spaced relation to the pressure liquid intake boss 18, leads lubricating fluid directly to a restriction axial counterbore space 44', with a further radial restriction passage 45' leading to the axial lubrication passage 50 mentioned above, from which the needle bearing is force-lubricated. Corresponding axial lubrication of the radial and axial thrust bearing will be to the left in FIG. 4, in the same way as described in reference to the first embodiment.

FIG. 5 illustrates a still further modified version of the improved clutch, as generally designated by the reference numeral 61, which is very similar to the form of FIGS. 1, 2 and 3, to the extent that corresponding reference numerals are employed to designate corresponding parts and relationships; hence further description thereof is dispensed with.

In accordance with the improvement shown in FIG. 5 (and it is applicable also to the other forms described above), the radial portion 45 of the restricted oil flow passage means is of a trifle greater axial width than the corresponding portion appearing in FIG. 3; and an annular flow control plate or ring member 62 is disposed in this space, paralleling the cylinder wall member 19 and the adjacent axial end face of ball bearing 13. Plate 62 is milled at the zone of the bore 42 to afford a local axial recess 63 therein; and at this partial thickness area said plate 62 is provided with an axial opening 64. Accordingly, axial oil flow takes place to the ball of bearing 13, as indicated by the arrow C, through the opening or port 64; and the remainder of oil flow, as indicated by arrow B, is through radial restriction passage 45 in a local zone to the left of control plate 62, thence axially through clearance space 50 and radially outwardly to the needle bearing 36. Special paths are provided for directing pressurized oil flow to the ball and needle bearing components; and this enables an accurate metering control of the proportionate quantities of oil furnished to those respective units.

It is evident that a corresponding proportional metering flow action also inheres in the annular washer-like guard and splash shield member 48 appearing in FIG. 1, in that in addition to limiting entry of foreign matter to bearing 13, and also protecting it physically, the member 48 limits escape of pressurized lubricating oil to the exterior of the clutch 10 by a restrictive throttling effect, hence maintains a desirable distribution of flow as between bearings 13 and 36.

What is claimed is:

1. In a fluid pressure clutch having a fixed mounting structure housing piston and cylinder-type means to selectively engage and disengage a clutch unit which operatively connects, when engaged, rotative input and output members of the clutch, there being an axial thrust bearing unit interposed between said clutch unit and a piston component of said first-named means, and a space within said fixed structure receiving a further bearing to journal one of said members in said structure; the improvement in accordance with which said housing structure has an externally opening pressure-lubricant supply port opening inwardly to said space, an axially extending passage in direct communication with said axial thrust bearing means to lubricate the latter independently of the operation of said first-named means, and flow-restricting passage means disposed in said mounting structure between the latter and said further bearing in communication with said supply port, said passage means also communicating said axially extending passage with said space and hence said lubricant supply port.

2. The improvement of claim 1, in which said further flow-restricting passage means has axially and radially extending portions in direct restricted communication with one another externally of said further bearing.

3. The improvement of claim 1, in which said further bearing is a radial load bearing and said flow-restricting passage means has axially and radially extending portions in direct restricted communication with one another externally of said radial bearing.

4. The improvement of claim 1, in which said flow restricting passage means also communicates directly with said further bearing internally of the latter.

5. The improvement of claim 2, in which said flow-restricting passage means also communicates directly with said further bearing internally of the latter.

6. The improvement of claim 3, in which said flow-restricting passage means also communicates directly with said radial load bearing internally of the latter.

7. The improvement of claim 1, in which said space receiving said further bearing means and said passage means are at least in part defined by a bore in said fixed mounting structure extending axially of the latter and opening through an outer axial end face thereof.

8. The improvement of claim 2, in which said space receiving said further bearing means and said passage means are at least in part defined by a bore in said fixed mounting structure extending axially of the latter and opening through an outer axial end face thereof.

9. The improvement of claim 3, in which said space receiving said further bearing means and said passage means are at least in part defined by a bore in said fixed mounting structure extending axially of the latter and opening through an outer axial end face thereof, said bore axially intersecting said supply port.

10. The improvement of claim 6, in which said space receiving said further bearing means and said passage means are at least in part defined by a bore in said fixed mounting structure extending axially of the latter and opening through an outer axial end face thereof, said bore axially intersecting said supply port.

11. The improvement of claim 1, in which said flow restricting passage means includes a portion having a member therein to physically direct oil flow as regards distribution to said axial thrust bearing unit and said further bearing.

12. The improvement of claim 1, in which said flow restricting passage means includes a radial portion having an annular member therein formed with an opening to physically direct oil flow as regards distribution to said axial thrust bearing unit and said further bearing.

13. The improvement of claim 12, in which said annular member has angularly spaced portions offset axially relative to one another and respectively in axial engagement with said radial bearing and an adjacent radial portion of said mounting structure.

14. The improvement of claim 12, in which said annular member has angularly spaced portions offset axially relative to one another and respectively in axial engagement with said radial bearing and an adjacent radial portion of said mounting structure, said opening being in a said portion engaging said radial bearing.

15. The improvement of claim 1, and further comprising annular plate means carried by said mounting structure on the side of said further bearing opposite said first-named means and affording a limited external metering escape of the pressure lubricant from said further bearing.

16. In a fluid pressure clutch having a fixed mounting structure housing piston and cylinder-type means to selectively engage and disengage a clutch unit which operatively connects, when engaged, rotative input and output members of the clutch, there being a first bearing interposed between said clutch unit and said first-named means, and a space within said fixed structure located on the side of said means opposite said first bearing and receiving a further bearing to journal one of said members in said structure; the improvement in accordance with which said housing structure has communication with an external source of pressurized liquid lubricant, and includes internal passaging distributing a flow of said lubricant to said first and further bearings independently of the operation of said first-named means, said passaging including a passage in communication with said external lubricant source and said first and further bearings.

17. The improvement of claim 16, in which said passaging includes an externally opening pressure-lubricant supply port opening inwardly to said space, said passage being in communication with said port.

18. The improvement of claim 16, and further comprising flow-restricting means associated with said mounting structure to distribute flow of said pressure lubricant as between said first and further bearings.

19. The improvement of claim 17, and further comprising flow-restricting means associated with said mounting structure to distribute flow of said pressure lubricant as between said first and further bearings.

20. The improvement of claim 16, in which said passaging is at least in part defined by a bore in said fixed mounting structure extending axially of the latter and opening through an outer axial end face thereof.

21. The improvement of claim 19, in which said passaging is at least in part defined by a bore in said fixed mounting structure extending axially of the latter and opening through an outer axial end face thereof.

22. The improvement of claim 18, in which said flow-restricting means is associated with said housing structure in said passage and between said further bearing and said first-named means.

23. The improvement of claim 21, in which said flow-restricting means is associated with said housing structure in said passage and between said further bearing and said first-named means.

24. The improvement of claim 18, in which said flow-restricting means is associated with said housing structure on the side of said further bearing opposite said first-named means.

25. The improvement of claim 21, in which said flow-restricting means is associated with said housing structure on the side of said further bearing opposite said first-named means.

26. The improvement of claim 16, and further comprising annular plate means carried by said mounting structure on the side of said further bearing opposite said first-named means and affording a limited external metering escape of the pressurized liquid lubricant from said further bearing.

27. The improvement of claim 20, and further comprising annular plate means carried by said mounting structure on the side of said further bearing opposite said first-named means and affording a limited external metering escape of the pressurized liquid lubricant from said further bearing.

* * * * *